United States Patent [19]
Westerbarkey

[11] 3,738,394
[45] June 12, 1973

[54] FLEXIBLE GROOVED PIPE
[75] Inventor: Leonard Westerbarkey, Gutersloh, Germany
[73] Assignee: Firma Westflexwerk L. & F., Westerbarkey, Gutersloh, Germany
[22] Filed: Jan. 29, 1971
[21] Appl. No.: 111,008

[52] U.S. Cl. .................. 138/122, 138/173, 138/129
[51] Int. Cl. ............................. F16l 9/18, F16l 9/00
[58] Field of Search ................. 138/109, 122, 129, 138/134, 178, 173

[56] References Cited
UNITED STATES PATENTS
2,986,169  5/1961  McCormick ...................... 138/109
2,954,802  10/1960  Duff ................................. 138/122

Primary Examiner—Martin P. Schwadron
Assistant Examiner—A. M. Zupcic
Attorney—Richards & Geier

[57] ABSTRACT

A helically-corrugated flexible pipe wound from metal foil or sheet metal strips is characterized in that the grooves or ribs are upset or pressed in a gradually increasing manner toward the ends of the pipe.

4 Claims, 3 Drawing Figures

PATENTED JUN 12 1973 3,738,394

Inventor:
L. Westerbarkey
By Richards & Geier
ATTORNEYS

FLEXIBLE GROOVED PIPE

This invention relates to a spirally grooved flexible pipe wound from metal foil or sheet metal. The invention refers more particularly to a pipe of this type which is built as a pipe section into a waste gas conduit or the like to absorb vibrations and balance elongations.

Pipes of this type are preferably made of metal foil, for example, refined steel, and they are subjected to very strong stresses, primarily vibration strains but also other mechanical and thermic as well as chemical stresses. Experiments which were actually carried out have shown that although such pipes are very well suited to be inserted, for example, as intermediate pieces to absorb vibrations in exhaust gas installations of motor cars, it was always discovered that cracks and also breakages take place in the flexible pipe at or close to its connection with the rigid pipes.

The present invention is based on the discovery that this phenomenon is caused by the fact that apparently the connecting parts or the transition parts are subjected to excessive strains since the vibrations start there and the material is thereby overstrained.

Therefore, an object of the present invention is to produce a pipe which will absorb vibrations and balance extensions, which is subjected to strains which are as uniform as possible along its entire length and which in its structure gradually changes from a rigid pipe into a flexible pipe.

Other objects of the present invention will become apparent in the course of the following specification.

In the accomplishment of the objectives of the present invention it was found desirable to provide a helically corrugated flexible pipe wound from metal foil or sheet metal and to upset or press its corrugations in a gradually increasing manner toward the ends of the pipe. The length in which the ribs are pressed in a gradually increasing manner toward the ends of the pipe corresponds to that of at least one diameter of the pipe but is preferably two or more pipe diameters. The compression of the corrugations increasing gradually to the end of pipe does not have to cover the entire circumference but can be arranged in individual wedge-shaped areas of the pipe wall widening toward the end of the pipe. The ends of the pipe have a flexibility which is gradually reduced to rigidity.

The invention will appear more clearly from the following detailed description when taken in connection with the accompanying drawing showing by way of example only, preferred embodiments of the inventive idea.

Figure 1:
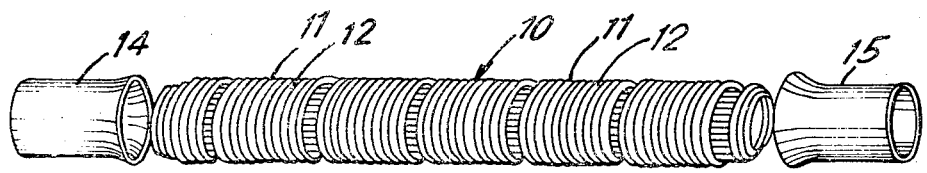
FIG. 1 is a perspective view of a flexible pipe.
Figure 2:
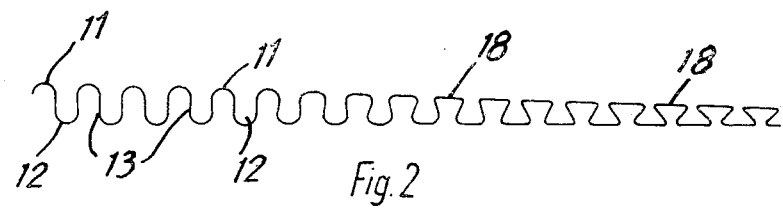
FIG. 2 is a diagram illustrating in cross-section the shape of a wall of the pipe shown in FIG. 1 at the end of the pipe.

The pipe 10 shown in FIGS. 1 and 2 is wound from sheet metal strips and is provided with circumferential helically extending corrugations with peaks 11 separated by troughs 12. The flanks of the peaks have comparatively short portions 13 which are straight and which preferably extend parallel to each other.

The pipe 10 is wound from ribbed strips of refined steel. The strips can consist of one or several layers and their edges are joined by folds. The ends of the pipe 10 may be introduced into and fixed to funnel-like connections 14 and 15 of a rigid pipe of an exhaust gas device of motor cars, stationary combustion motors or the like.

As shown in FIG. 2, at the ends of the pipe the corrugations are gradually more and more compressed until they assume a shape wherein the initially round peaks 11 and the initially round troughs 12 become more and more flat (18 in FIG. 2) and the spaces between these round portions become gradually less and less until shortly before the end of the pipe the flattened ribs touch each other.

This or change of shape of the corrugations results in that the pipe gradually loses its flexibility toward its end while its rigidity increases correspondingly. Vibrations or other mechanical stresses introduced into the pipe 10 by the rigid pipe 14, 15 are completely absorbed due to this specific shape of the ends of the pipe 10. These rigid ends of the pipe 10 will vibrate in the same manner as the connected rigid pipe 14, 15. Since the pipe 10 becomes gradually more flexible and bendable at a distance from the pipe ends 14 and 15, the introduced vibrations will be more uniformly distributed and can be better received and absorbed. Extensive lengthy experimentation has shown that the stability of a pipe made in accordance with the present invention is greater by at least the tenth power than those of other similar pipes the ends of which have not been shaped. It appears that in the case of such unshaped pipes the entire vibration energy is received at their ends, so that the material is excessively stressed there.

By way of example, the change in shape or the compression of the ends of the pipe 10 can be carried out by placing the pipe tightly upon a massive bar and then applying to the ribs a pressure tool or a rolling tool with a pressure which increases toward the ends of the pipe until the profile shown in FIG. 2 is produced.

Figure 3:
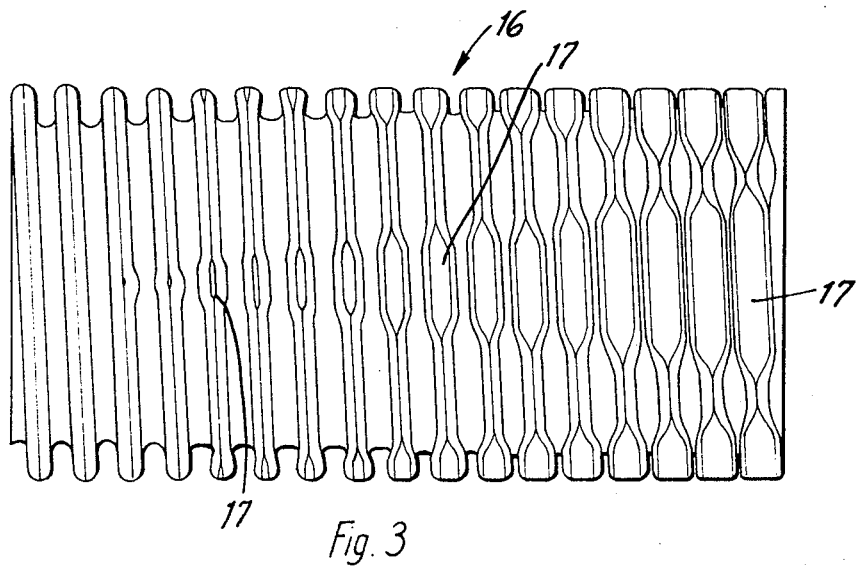
FIG. 3 is a front view of a differently shaped pipe.

However, it is not absolutely necessary to change the shape of the corrugations upon the entire circumference of the pipe. FIG. 3 shows a pipe 16 wherein the ribs are changed in a wedge-shaped section 17 which widens toward the end of the pipe. Obviously there may be several such sections.

I claim:

1. A helically corrugated flexible wound metal pipe, the corrugations of said pipe being increasingly radially compressed towards at least one end of the pipe.

2. A pipe in accordance with claim 1, wherein the corrugations an and end of the pipe are increasingly compressed over a length of the pipe corresponding to at least one diameter of the pipe.

3. A pipe in accordance with claim 1, wherein the corrugations are increasingly compressed in at least one wedge-shaped area of the pipe wall, said area widening towards the end of the pipe.

4. A pipe in accordance with claim 1, wherein the flexibility of the pipe gradually diminishes toward the ends of the pipe, said ends being rigid.

* * * * *